United States Patent
Azami

(10) Patent No.: US 11,362,318 B2
(45) Date of Patent: Jun. 14, 2022

(54) LITHIUM ION SECONDARY BATTERY

(71) Applicant: NEC CORPORATION, Tokyo (JP)

(72) Inventor: Takeshi Azami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 107 days.

(21) Appl. No.: 16/332,987

(22) PCT Filed: Aug. 3, 2017

(86) PCT No.: PCT/JP2017/028235
§ 371 (c)(1),
(2) Date: Mar. 13, 2019

(87) PCT Pub. No.: WO2018/051667
PCT Pub. Date: Mar. 22, 2018

(65) Prior Publication Data
US 2019/0280284 A1    Sep. 12, 2019

(30) Foreign Application Priority Data
Sep. 14, 2016   (JP) .............................. JP2016-179881

(51) Int. Cl.
H01M 4/131 (2010.01)
H01M 4/1391 (2010.01)
(Continued)

(52) U.S. Cl.
CPC ......... H01M 4/131 (2013.01); H01M 4/1391 (2013.01); H01M 4/505 (2013.01);
(Continued)

(58) Field of Classification Search
CPC .... H01M 4/131; H01M 10/052; H01M 4/505; H01M 10/0566; H01M 4/525;
(Continued)

(56) References Cited

U.S. PATENT DOCUMENTS

| | | | | |
|---|---|---|---|---|
| 2006/0141361 | A1* | 6/2006 | Yuasa | H01M 10/052 429/231.1 |
| 2011/0151328 | A1* | 6/2011 | Chang | H01M 4/62 429/223 |

(Continued)

FOREIGN PATENT DOCUMENTS

| CN | 101919089 A | 12/2010 |
|---|---|---|
| CN | 102272985 A | 12/2011 |

(Continued)

OTHER PUBLICATIONS

International Search Report for PCT/JP2017/028235 dated Sep. 12, 2017 [PCT/ISA/210].
Chinese Office Action for CN Application No. 201780055923.9 dated May 31, 2021 with English Translation.

*Primary Examiner* — Lisa S Park
(74) *Attorney, Agent, or Firm* — Sughrue Mion, PLLC

(57) ABSTRACT

A purpose of one embodiment of the present invention is to provide a lithium ion secondary battery which comprises lithium nickel composite oxide having high nickel content in a positive electrode and has excellent battery characteristics. The first lithium ion secondary battery of the present invention comprises a lithium nickel composite oxide represented by the following formula and carbon nanotubes in a positive electrode, wherein a ratio (a)/(b) of an average length (a) of the carbon nanotubes to an average particle size (b) of primary particles of the lithium nickel composite oxide is 0.5 or more, $$Li_yNi_{(1-x)}M_xO_2$$

wherein $0 \leq x \leq 0.4$, $0 < y \leq 1.2$, and M is at least one element selected from the group consisting of Co, Al, Mn, Fe, Ti, and B.

7 Claims, 3 Drawing Sheets

(51) Int. Cl.
*H01M 10/0525* (2010.01)
*H01M 10/052* (2010.01)
*H01M 4/505* (2010.01)
*H01M 10/0566* (2010.01)
*H01M 4/525* (2010.01)
*H01M 4/62* (2006.01)
*H01M 4/02* (2006.01)

(52) U.S. Cl.
CPC .............. *H01M 4/525* (2013.01); *H01M 4/62* (2013.01); *H01M 10/052* (2013.01); *H01M 10/0525* (2013.01); *H01M 10/0566* (2013.01); *H01M 2004/028* (2013.01); *H01M 2220/20* (2013.01); *Y02E 60/10* (2013.01); *Y02T 10/70* (2013.01)

(58) Field of Classification Search
CPC .. H01M 4/62; H01M 4/1391; H01M 10/0525; H01M 2004/028; H01M 2220/20; H01M 4/625; H01M 2004/021; Y02E 60/10; Y02T 10/70; Y02P 70/50
See application file for complete search history.

(56) References Cited

U.S. PATENT DOCUMENTS

| 2013/0337326 | A1 | 12/2013 | Mun et al. | |
| 2015/0079469 | A1* | 3/2015 | Yoshikawa | H01M 4/623 |
| | | | | 429/217 |
| 2015/0093649 | A1* | 4/2015 | Arai | C09D 101/284 |
| | | | | 429/245 |
| 2015/0104701 | A1* | 4/2015 | Azami | H01M 4/505 |
| | | | | 429/188 |

FOREIGN PATENT DOCUMENTS

| CN | 102823038 A | 12/2012 |
| CN | 104247111 A | 12/2014 |
| CN | 104247135 A | 12/2014 |
| JP | 2000-353525 A | 12/2000 |
| JP | 2006-344523 A | 12/2006 |
| JP | 2007-048692 A | 2/2007 |
| JP | 2013-506266 A | 2/2013 |
| JP | 2016-131123 A | 7/2016 |

\* cited by examiner

LITHIUM ION SECONDARY BATTERY

CROSS REFERENCE TO RELATED APPLICATIONS

This application is a National Stage of International Application No. PCT/JP2017/028235 filed Aug. 3, 2017, claiming priority based on Japanese Patent Application No. 2016-179881 filed Sep. 14, 2016, the entire disclosure of which is hereby incorporated by reference.

TECHNICAL FIELD

The present invention relates to a battery, a method for manufacturing the battery and a vehicle equipped with the battery.

BACKGROUND ART

A lithium ion secondary battery has been widely put into practical use as batteries for notebook type personal computers, mobile phones and the like because of its advantages such as high energy density and excellent long-term reliability. In recent years, improvement of electronic devices and the use in electric vehicles have been advanced, and thus further improvement of battery characteristics, such as capacity, energy density, lifetime, and safety, are strongly desired.

To enhance the energy density of the battery, it is preferable to use a compound having high capacity as a positive electrode active material. In recent years, lithium nickel composite oxides in which a part of the Ni of lithium nickelate ($LiNiO_2$) is replaced with another metal element have been widely used as the compounds having high capacity. Among them, those having high nickel content are particularly preferable because of high capacity. On the other hand, a battery using the lithium nickel composite oxide having high nickel content as a positive electrode active material has high initial capacity compared with conventional ones, but has a problem in that the capacity decreases as charge and discharge are repeated. For this reason, studies are made on the lithium ion secondary battery using the lithium nickel composite oxide having high nickel content to improve its cycle characteristics.

Patent document 1 discloses that battery capacity deterioration caused by repeating charge and discharge cycles can be reduced by substituting a part of nickel site of $LiNiO_2$ having a layered rock salt structure with Co and optionally one or more elements of Al, Fe, Mn and B to stabilize the crystal structure, and using a water soluble polymer as a binder for a carbon material that is a negative electrode active material to prevent an electrolytic solution from swelling the binder.

CITATION LIST

Patent Literature

Patent document 1: Japanese Patent Laid-Open No. 2000-353525

SUMMARY OF INVENTION

Technical Problem

Even the lithium ion secondary battery described in the above mentioned Patent document 1 does not have sufficient cycle characteristics and still has the problem that battery capacity gradually decreases as charge and discharge cycles are repeated. In addition, further improvement in other battery characteristics, such as capacity, energy density and storage characteristics, are also strongly desired.

The purpose of one embodiment of the present invention is to provide a lithium ion secondary battery which comprises a lithium nickel composite oxide having high nickel content in a positive electrode and has excellent battery characteristics.

Solution to Problem

The first lithium ion secondary battery of the present invention comprises a lithium nickel composite oxide represented by the following formula and carbon nanotubes in a positive electrode, wherein a ratio (a)/(b) of an average length (a) of the carbon nanotubes to an average particle size (b) of primary particles of the lithium nickel composite oxide is 0.5 or more.

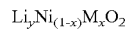

wherein $0 \leq x \leq 0.4$, $0 < x \leq 1.2$, and M is at least one element selected from the group consisting of Co, Al, Mn, Fe, Ti, and B.

Advantageous Effects of Invention

According to an embodiment of the present invention, a lithium ion secondary battery which comprises a lithium nickel composite oxide having high nickel content in a positive electrode and has excellent battery characteristics can be provided.

DESCRIPTION OF EMBODIMENTS

Hereafter, constituents of the battery of the present embodiment and a manufacturing method of the battery will be described.

<Positive Electrode>

The positive electrode comprises a current collector and a positive electrode mixture layer which is provided on the current collector and comprises a positive electrode active material, a conductive material and a binder.

The positive electrode comprises a lithium nickel composite oxide represented by the following formula (1) as a positive electrode active material.

$$Li_y Ni_{(1-x)} M_x O_2 \qquad (1)$$

wherein 0≤x≤0.4, 0<y≤1.2, and M is at least one element selected from the group consisting of Co, Al, Mn, Fe, Ti, and B.

Figure 3:
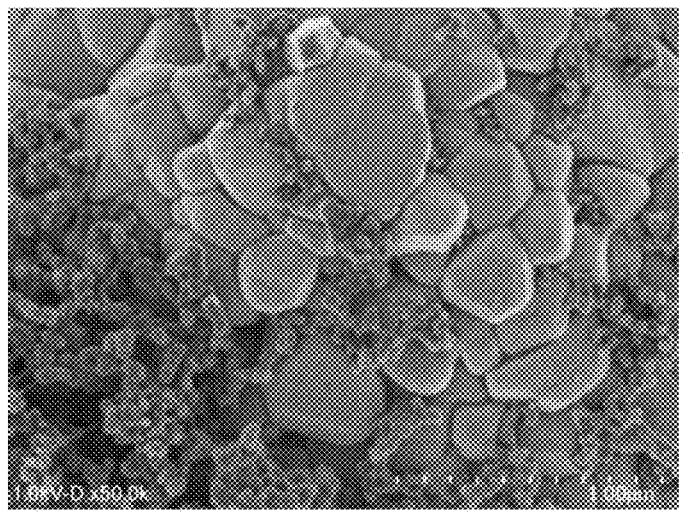
FIG. 3 is a SEM image of a secondary particle of $LiNi_{0.8}Co_{0.15}Al_{0.05}O_2$ in a positive electrode mixture layer before charge and discharge.
Figure 4:
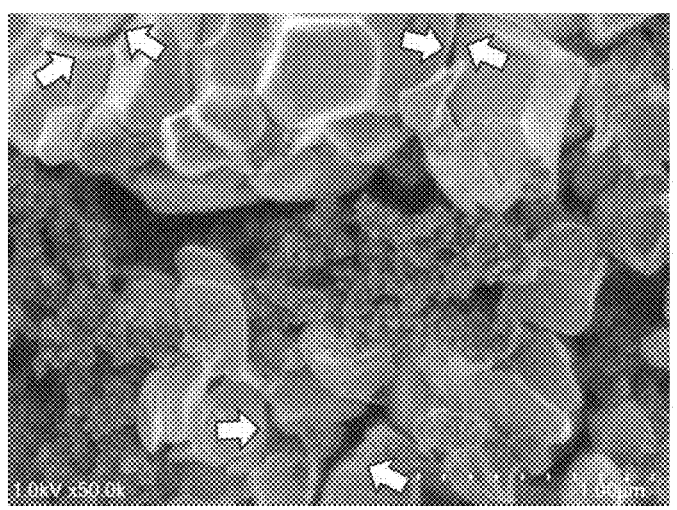
FIG. 4 is a SEM image of a secondary particle of $LiNi_{0.8}Co_{0.15}Al_{0.05}O_2$ in the same positive electrode mixture layer as in FIG. 3 after charge and discharge.

A secondary particle is an aggregate of multiple primary particles. In general, the primary particles are in close contact with each other in a secondary particle of the lithium nickel composite oxide. Therefore, there is no gap or only small gaps on the surface of the secondary particle of the lithium nickel composite oxide. However, when the nickel content is high as x is 0.4 or less in the formula (1), primary particles on the surface of a secondary particle of the lithium nickel composite oxide are torn apart from each other to create gaps by repeating charge-discharge cycles. FIG. 3 is a SEM image of the surface of a secondary particle of $LiNi_{0.8}Co_{0.15}Al_{0.05}O_2$ in the positive electrode mixture layer before charge and discharge. FIG. 4 is a SEM image of the surface of a secondary particle of $LiNi_{0.8}Co_{0.15}Al_{0.05}O_2$ in the same positive electrode mixture layer as in FIG. 3 after repeating charge and discharge. Since $LiNi_{0.8}Co_{0.15}Al_{0.05}O_2$ has a high nickel content, gaps are created on the surface of a secondary particle after repeating charge and discharge as indicated by arrows in FIG. 4. As these gaps expand, the electronic resistance of the positive electrode mixture layer increases, and the capacity of the battery lowers gradually. For this reason, the lithium nickel composite oxides having high nickel content tend to have insufficient cycle characteristics as compared with other positive electrode active materials such as lithium nickel composite oxides having low nickel content and materials not containing nickel.

In formula (1), x is preferably 0.3 or less, and more preferably 0.2 or less. Examples of such compounds include $Li_\alpha Ni_\beta Co_\gamma Mn_\delta O_2$ (0<α≤1.2, preferably 1≤α≤1.2, β+γ+δ=1, β≥0.7, and γ≤0.2) and $Li_\alpha Ni_\beta Co_\gamma Al_\delta O_2$ (0<δ≤1.2, preferably 1≤α≤1.2, β+γ+δ=1, β≥0.7, and γ≤0.2) and particularly include $LiNi_\beta Co_\gamma Mn_\delta O_2$ (0.75≤β≤0.85, 0.05≤γ≤0.15, and 0.10≤δ≤0.20). More specifically, for example, $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, and $LiNi_{0.8}Co_{0.1}O_2$ may be preferably used.

The lower limit of the average particle size of the primary particles of the lithium nickel composite oxide represented by formula (1) is preferably 50 nm or more, more preferably 200 nm or more, and most preferably 300 nm or more. The upper limit of the average particle size of the primary particles of the lithium nickel composite oxide represented by formula (1) is preferably 700 nm or less, more preferably 600 nm or less, and most preferably 500 nm or less. The average particle size of the primary particles can be determined by observing the positive electrode mixture layer with an electron microscope such as a transmission electron microscope (TEM) or a scanning electron microscope (SEM), measuring the maximum distance between two different points on the outline of a primary particle of the lithium nickel composite oxide represented by formula (1), and calculating the arithmetic average value of 100 particles.

The lower limit of the average particle size of the secondary particles of the lithium nickel composite oxide represented by formula (1) is preferably 1 μm or more and more preferably 3 μm or more. The upper limit of the average particle size of the secondary particles of the lithium nickel composite oxide represented by formula (1) is preferably 16 μm or less and more preferably 12 μm or less. The average particle size of the secondary particles can be determined by observing the positive electrode mixture layer with an electron microscope such as a transmission electron microscope (TEM) or a scanning electron microscope (SEM), measuring the maximum distance between two different points on the outline of a secondary particle of the lithium nickel composite oxide represented by formula (1), and calculating the arithmetic average value of 100 particles.

The lower limit of the content of the lithium nickel composite oxide represented by formula (1) in the positive electrode mixture layer is preferably 30 mass % or more and more preferably 60 mass % or more. The upper limit of the content of the lithium nickel composite oxide represented by formula (1) in the positive electrode mixture layer is preferably 99 mass % or less and more preferably 97 mass % or less.

The positive electrode comprises carbon nanotubes as conductive materials. The carbon nanotube is a carbon material formed from planar graphene sheets having a 6-membered ring of carbon. Carbon nanotubes, in which planar graphene sheets having a 6-membered ring of carbon are formed into a cylindrical shape, may have either a single layer or a coaxial multilayered structure. Further, both ends of the cylindrical carbon nanotube may be open, but may be closed with hemispherical fullerene containing 5-membered rings or 7-membered rings of carbon. Since the carbon nanotube has an elongated shape in addition to high conductivity, it is useful for forming a conductive path between the active material particles. The carbon nanotube forms a conductive path in the gap between the primary particles of the lithium nickel composite oxide, and may prevent the increase in electronic resistance.

Figure 5:
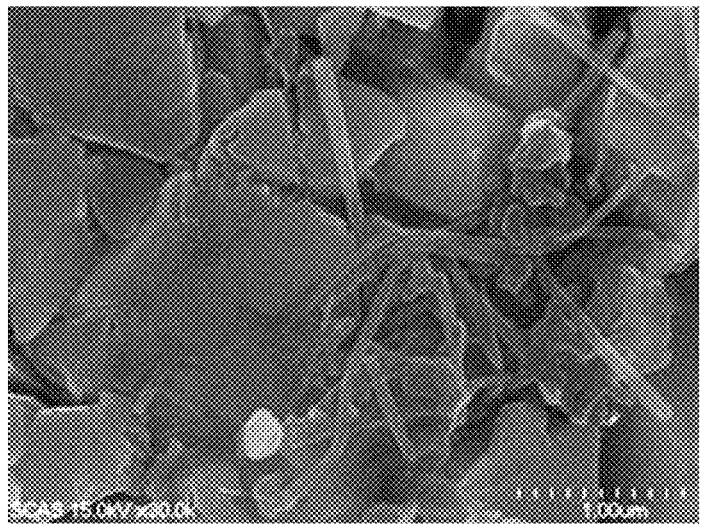
FIG. 5 is a SEM image of a positive electrode mixture layer using carbon nanotubes having a diameter of 65 nm to 110 nm.

The lower limit of the average diameter of the outermost cylinders of the carbon nanotubes is preferably 5 nm or more and more preferably 10 nm or more. The upper limit of the average diameter of the outermost cylinders of the carbon nanotubes is preferably 40 nm or less and more preferably 30 nm or less. The lower limit of the average length of the carbon nanotubes is preferably 100 nm or more, more preferably 200 nm or more and most preferably 300 nm or more. The upper limit of the average length of the carbon nanotubes is preferably 1000 nm or less and more preferably 840 nm or less. When the diameters and the length of the carbon nanotubes are adjusted properly, the carbon nanotubes can enter the gaps formed between the primary particles of the lithium nickel composite oxide. For this reason, the carbon nanotube forms a conductive path between the divided primary particles, thereby preventing the increase in electronic resistance. FIG. 5 shows a SEM image of a positive electrode mixture layer using $LiNi_{0.8}Co_{0.15}Al_{0.05}O_2$ as an active material and carbon nanotubes and carbon black as conductive materials. The carbon nanotubes have a diameter of 65 nm to 110 nm. When carbon nanotubes having large diameters are used, since the carbon nanotubes do not enter between the primary particles of the active material, no conductive path is formed.

The average length of the carbon nanotubes can be determined by observing the positive electrode mixture layer with an electron microscope such as a transmission electron microscope (TEM) or a scanning electron microscope (SEM), measuring the length of 100 carbon nanotubes, and calculating the arithmetic average value thereof. The length is the distance between both ends of a straightened carbon nanotube. The average diameter of the carbon nanotubes can be determined by observing the positive electrode mixture layer with an electron microscope such as a transmission electron microscope (TEM) or a scanning electron microscope (SEM), measuring the diameters of the outermost cylinders of 100 carbon nanotubes, and calculating the arithmetic average value thereof.

In a Raman spectrum obtained by Raman spectroscopic measurement of the carbon nanotubes used, the ratio $(I_D/I_G)$ of the peak intensity $(I_D)$ of D band and the peak intensity $(I_G)$ of G band is preferably 0.2 or more and 0.9 or less and more preferably 0.3 or more and 0.8 or less. Herein, the peak intensity $(I_D)$ of D band means the peak intensity of the highest peak in the range of 1000 to 1400 $cm^{-1}$, and the peak intensity $(I_G)$ of G band means the peak intensity of the highest peak in the range of 1500 to 1700 $cm^{-1}$.

The lower limit of the content of the carbon nanotubes in the positive electrode mixture layer is preferably 0.5 mass % or more and more preferably 1 mass % or more. The upper limit of the content of the carbon nanotubes in the positive electrode mixture layer is preferably 20 mass % or less and more preferably 10 mass % or less.

Figure 6:
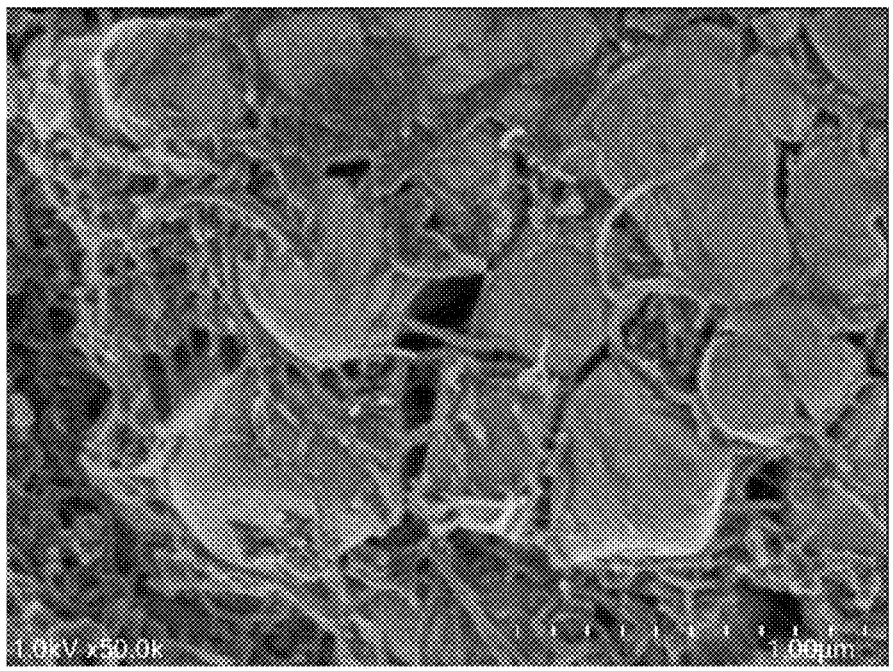
FIG. 6 is a SEM image of a positive electrode mixture layer in which (a)/(b) is 0.5 or more, wherein (a) represents the average length of carbon nanotubes, and (b) represents the average particle size of primary particles of a lithium nickel composite oxide.
Figure 7:
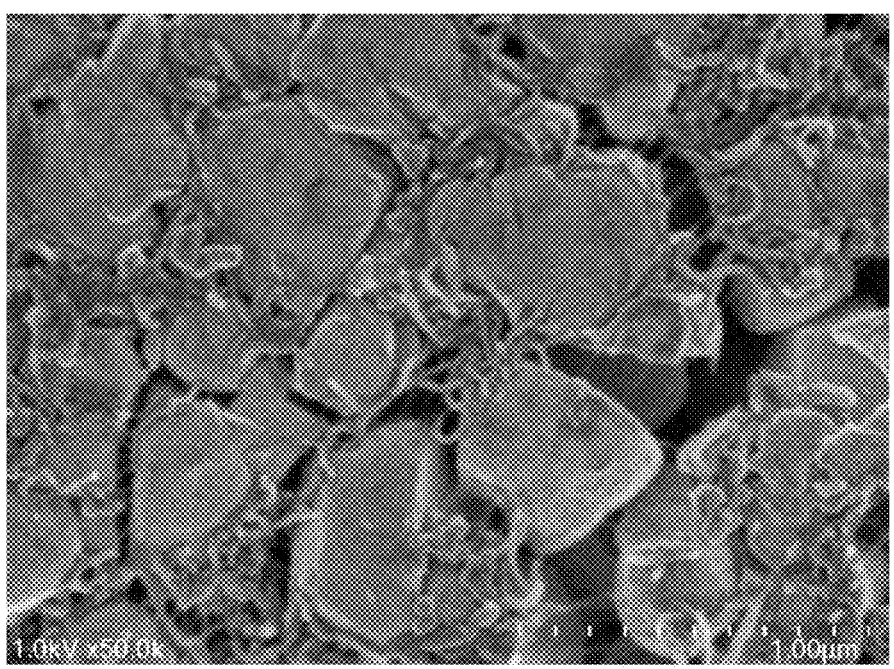
FIG. 7 is a SEM image of a positive electrode mixture layer in which (a)/(b) is less than 0.5, wherein (a) represents the average length of carbon nanotubes, and (b) represents the average particle size of primary particles of a lithium nickel composite oxide.

The lower limit of (a)/(b) that is the ratio of the average length (a) of the carbon nanotubes to the average particle size (b) of primary particles of the lithium nickel composite oxide represented by formula (1) is preferably 0.5 or more, more preferably 0.8 or more and most preferably 1.1 or more. The upper limit of (a)/(b) that is the ratio of the average length (a) of the carbon nanotubes to the average particle size (b) of primary particles of the lithium nickel composite oxide represented by formula (1) is preferably 5 or less and more preferably 3 or less. (a)/(b) is calculated by (a) and (b) in the same unite. When (a)/(b) is within an appropriate range, the carbon nanotubes can enter the gaps formed between the primary particles of the lithium nickel composite oxide. For this reason, the carbon nanotubes can form conductive paths between the divided primary particles, thereby preventing an increase in electronic resistance. FIG. 6 shows a SEM image of a positive electrode mixture layer which uses $LiNi_{0.8}Co_{0.15}Al_{0.05}O_2$ as an active material, and carbon nanotubes and carbon black as conductive materials, and in which (a)/(b) is 0.5 or more. FIG. 7 shows a SEM image of a positive electrode mixture layer which uses $LiNi_{0.8}Co_{0.15}Al_{0.05}O_2$ as an active material and carbon nanotubes and carbon black as conductive materials, and in which (a)/(b) is less than 0.5. In the positive electrode mixture layer shown in FIG. 7, gaps without carbon nanotubes are present, and conductive paths are not properly formed between the primary particles of the lithium nickel composite oxide. The positive electrode mixture layers shown in FIGS. 6 and 7 have been pressed before charge and discharge.

The positive electrode may further comprise a conductive material other than the carbon nanotubes. As a preferred conductive material, carbon black is exemplified. When the carbon nanotubes and the carbon black are mixed, there is an advantage that an aggregate (structure) that forms conductive paths are larger than when carbon black is used alone. The lower limit of the content of the carbon black in the positive electrode mixture layer is preferably 0.5 mass % or more and more preferably 1 mass % or more. The upper limit of the content of the carbon black in the positive electrode mixture layer is preferably 10 mass % or less and more preferably 5 mass % or less. It is preferable to use the carbon black together with the carbon nanotubes as conductive materials, and a higher capacity retention rate can be achieved when the mass ratio of the carbon nanotubes in the conductive material is high.

Acetylene black and Ketjen black may be used. Vapor-grown carbon fibers may also be used.

To prevent the gaps between the primary particles on the surface of the secondary particle from spreading by repeating charge and discharge, it is also preferable to make small gaps between the primary particles on the surface of the secondary particle prior to charge and discharge. The size of the gap is defined by "split width". Herein, the term, "split width of a primary particle" means the shortest distance between the outline of the first primary particle and the outline of the second primary particle in an electron microscope image of an electrode mixture layer, wherein the first primary particle is present on the surface of a secondary particle and may be arbitrary selected, and the second primary particle is present on the surface of the same secondary particle as the first primary particle and is, among primary particles adjacent to the first primary particle, the farthest away from the first primary particle. If there is no other primary particle between the shortest distance between the outline of the first primary particle and the outline of the second primary particle, the first primary particle and the second primary particle may be considered to be adjacent to each other. The lower limit of the average split width of primary particles of the lithium nickel composite oxide in the electrode mixture layer is preferably 20 nm or more, more preferably 50 nm or more and most preferably 200 nm or more. The upper limit of the average split width of primary particles of the lithium nickel composite oxide in the electrode mixture layer is preferably 700 nm or less, more preferably 500 nm or less, and most preferably 400 nm or less. The split width can be measured by observing the positive electrode mixture layer by an electron microscope such as a transmission electron microscope (TEM) or a scanning electron microscope (SEM). The average split width can be determined by measuring split width of 100 primary particles of the lithium nickel composite oxide represented by formula (1), and calculating the arithmetic average value thereof. Although the detailed mechanism has not been elucidated, the inventor has found that when the lithium nickel composite oxide has a split width before initial charge, expansion of a split width caused by expansion and contraction may be reduced. It has been also found that when the electrode has a structure in which the carbon nanotubes are appropriately arranged in the split width of the lithium nickel composite oxide, an increase in resistance can be prevented.

When the outline of a primary particle has a portion which is not in contact with another primary particle in an electron microscope image, the primary particle is divided from another primary particle, and the primary particle may be considered to be one having a split width. The ratio of primary particles having split widths in primary particles present on the surface of a secondary particle of the lithium nickel composite oxide is preferably 30% or more, more preferably 60% or more, and may be 100%.

The positive electrode binder is not particularly limited, and polyvinylidene fluoride, vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamide-imide and the like may be used. Also, the positive electrode binder may be a mixture, a copolymer or a cross-linked body of a plurality of the above resins, such as styrene butadiene rubber (SBR). When an aqueous binder such as an SBR emulsion is used, a thickener such as carboxymethyl cellulose (CMC) can also be used.

The amount of the binder is preferably 0.5 to 20 parts by mass based on 100 parts by mass of the active material, from the viewpoint of the sufficient binding strength and the high energy density being in a trade-off relation with each other.

The positive electrode current collector is not particularly limited, but aluminum, nickel, silver, or an alloy thereof may be used. As the shape of the positive electrode current collector, foil, flat plate, mesh and the like are exemplified.

The positive electrode according to the present embodiment can be produced by preparing a slurry comprising the positive electrode active material comprising the lithium nickel composite oxide represented by formula (1), the conductive material comprising carbon nanotubes, the binder and a solvent, and applying it to the positive electrode current collector to form the positive electrode mixture layer. The unit weight that shows the coating amount of the electrode mixture on the current collector is, but not particularly limited, preferably 20 mg/cm$^2$ or more and 90 mg/cm$^2$ or less, and more preferably 30 mg/cm$^2$ or more and 80 mg/cm$^2$ or less.

In addition, in order to make a split width between primary particles of the positive electrode active material, it is preferable to add a step of pressing the positive electrode after the positive electrode mixture layer is formed. The method for pressing is not particularly limited, but a hydraulic roll press is preferred, and a hydraulic heat roll press is more preferred. The temperature of the heat roll press is preferably 90° C. to 130° C., more preferably 100° C. to 120° C., and particularly preferably 105° C. to 115° C. The lower limit of the density of the electrode mixture layer after pressing is preferably 3.25 g/cm$^3$ or more, and more preferably 3.3 g/cm$^3$ or more. The upper limit of the density of the electrode mixture layer after pressing is preferably 3.7 g/cm$^3$ or less, and more preferably 3.4 g/cm$^3$ or less. A split width in the above appropriate range can be provided by pressing the positive electrode to such a density.

<Negative Electrode>

The negative electrode comprises a current collector and a negative electrode mixture layer which is provided on the current collector and comprises a negative electrode active material, a conductive material and a binder.

The negative electrode active material is not particularly limited as long as it is a material capable of reversibly intercalating and deintercalating lithium ions upon charge/discharge. Specifically, metals, metal oxides and carbon are exemplified.

Examples of the metal include Li, Al, Si, Pb, Sn, In, Bi, Ag, Ba, Ca, Hg, Pd, Pt, Te, Zn, La, alloys of two or more of these and the like. Alternatively, it may be used by mixing two or more of these metals and alloys. These metals and alloys may comprise one or more non-metal elements.

Examples of the metal oxide include silicon oxide, aluminum oxide, tin oxide, indium oxide, zinc oxide, lithium oxide, and composites of these. In the present embodiment, tin oxide or silicon oxide is preferably contained as a negative electrode active material of the metal oxide, and silicon oxide is more preferably contained. This is because silicon oxide is relatively stable and is unlikely to trigger a reaction with other compounds. As silicon oxide, those represented by the composition formula $SiO_x$ ($0<x\leq2$) are preferred. Also, for example, 0.1 to 5 mass % of one or two or more elements selected from nitrogen, boron, and sulfur can be added to the metal oxide. In this way, the electroconductivity of the metal oxide can be enhanced.

Examples of the carbon include graphite, amorphous carbon, graphene, diamond-like carbon, carbon nanotube, and composites thereof. Here, highly crystalline graphite is highly electroconductive, and has excellent adhesion to a negative electrode current collector composed of a metal such as copper as well as voltage flatness. On the other hand, low-crystallinity amorphous carbon shows relatively small volume expansion, is thus highly effective in lessening the volume expansion of the entire negative electrode, and is unlikely to undergo degradation resulting from non-uniformity such as grain boundaries and defects.

The negative electrode binder is not particularly limited, and polyvinylidene fluoride (PVdF), vinylidene fluoride-hexafluoropropylene copolymer, vinylidene fluoride-tetrafluoroethylene copolymer, polytetrafluoroethylene, polypropylene, polyethylene, polybutadiene, polyacrylic acid, polyacrylic ester, polystyrene, polyacrylonitrile, polyimide, polyamideimide and the like may be used. Also, the negative electrode binder may be a mixture, a copolymer or a cross-linked body of a plurality of the above resins, such as styrene butadiene rubber (SBR). When an aqueous binder such as an SBR emulsion is used, a thickener such as carboxymethyl cellulose (CMC) can also be used.

The amount of the binder is preferably 0.5 to 20 parts by mass based on 100 parts by mass of the active material, from the viewpoint of the sufficient binding strength and the high energy density being in a trade-off relation with each other.

From the viewpoint of improving conductivity, the negative electrode may comprise a conductive material such as carbonaceous fine particles of graphite, carbon black, acetylene black or the like.

As the negative electrode current collector, from the viewpoint of electrochemical stability, aluminum, nickel, stainless steel, chrome, copper, silver, and alloys thereof may be used. As the shape thereof, foil, flat plate, mesh and the like are exemplified.

The negative electrode of the present embodiment may be produced by preparing a slurry comprising the negative electrode active material, the conductive material, the binder and a solvent, and applying it to the negative electrode current collector to form the negative electrode mixture layer.

<Electrolyte Solution>

The electrolyte solution comprises a nonaqueous solvent and a supporting salt. Examples of the non-aqueous solvent include, but not particularly limited, aprotic organic solvents, for examples, cyclic carbonates such as propylene carbonate (PC), ethylene carbonate (EC) and butylene carbonate (BC); open-chain carbonates such as dimethyl carbonate (DMC), diethyl carbonate (DEC), ethyl methyl carbonate (MEC) and dipropyl carbonate (DPC); aliphatic carboxylic acid esters such as propylene carbonate derivatives, methyl formate, methyl acetate and ethyl propionate; ethers such as diethyl ether and ethyl propyl ether; phosphoric acid esters such as trimethyl phosphate, triethyl phosphate, tripropyl phosphate, trioctyl phosphate and triphenyl phosphate; and fluorinated aprotic organic solvents obtainable by substituting at least part of hydrogen atoms of these compounds with fluorine atom(s), and the like.

Among them, a cyclic or open-chain carbonate(s) such as ethylene carbonate (EC), propylene carbonate (PC), butylene carbonate (BC), dimethyl carbonate (DMC), diethyl carbonate (DEC), ethyl methyl carbonate (MEC) or dipropyl carbonate (DPC) is preferably contained.

The nonaqueous solvent may be used alone or in combination of two or more.

The supporting salt is not particularly limited except that it comprises Li. Examples of the supporting salt include $LiPF_6$, $LiAsF_6$, $LiAlCl_4$, $LiClO_4$, $LiBF_4$, $LiSbF_6$, $LiCF_3SO_3$, $LiC_4F_9SO_3$, $LiC(CF_3SO_2)_2$, $LiN(FSO_2)_2$, $LiN(CF_3SO_2)_2$, $LiN(C_2F_5SO_2)_2$, $LiB_{10}Cl_{10}$. In addition, the supporting salt includes lower aliphatic lithium carboxylate, chloroboran lithium, lithium tetraphenylborate, LiBr, LiI, LiSCN, LiCl and the like. The supporting salt may be used alone or in combination of two or more.

The concentration of the supporting salt in the electrolyte solution is preferably 0.5 mol/L to 1.5 mol/L. When the concentration of the supporting salt is within this range, adjustment of density, viscosity and conductivity becomes easy.

<Separator>

The separator may be of any type as long as it suppresses electron conduction between a positive electrode and a negative electrode, does not inhibit permeation of charged substances, and has durability against the electrolyte solution. Specific examples of a material used for such a separator include polyolefins such as polypropylene and polyethylene, cellulose, polyesters such as polyethylene terephthalate and polybutylene terephtalate, polyimide, polyvinylidene fluoride, and aromatic polyamides (aramid) such as polymetaphenylene isophthalamide, polyparaphenylene terephthalamide and copolyparaphenylene 3,4'-oxydiphenylene terephthalamide, and the like. These can be used as porous films, woven fabrics, nonwoven fabrics or the like.

<Insulation Layer>

An insulation layer may be formed on a surface of at least one of the positive electrode, the negative electrode and the separator. Examples of a method for forming the insulation layer include a doctor blade method, a dip coating method, a die coater method, a CVD method, a sputtering method, and the like. The insulation layer may be formed at the same time as the positive electrode, negative electrode or separator. Materials constituting the insulation layer include a mixture of an insulating filler such as aluminum oxide or barium titanate and a binder such as SBR or PVdF. In an embodiment where the insulation layer is provided on an electrode, the battery may not comprise the separator.

<Structure of Lithium Ion Secondary Battery>

Figure 1:
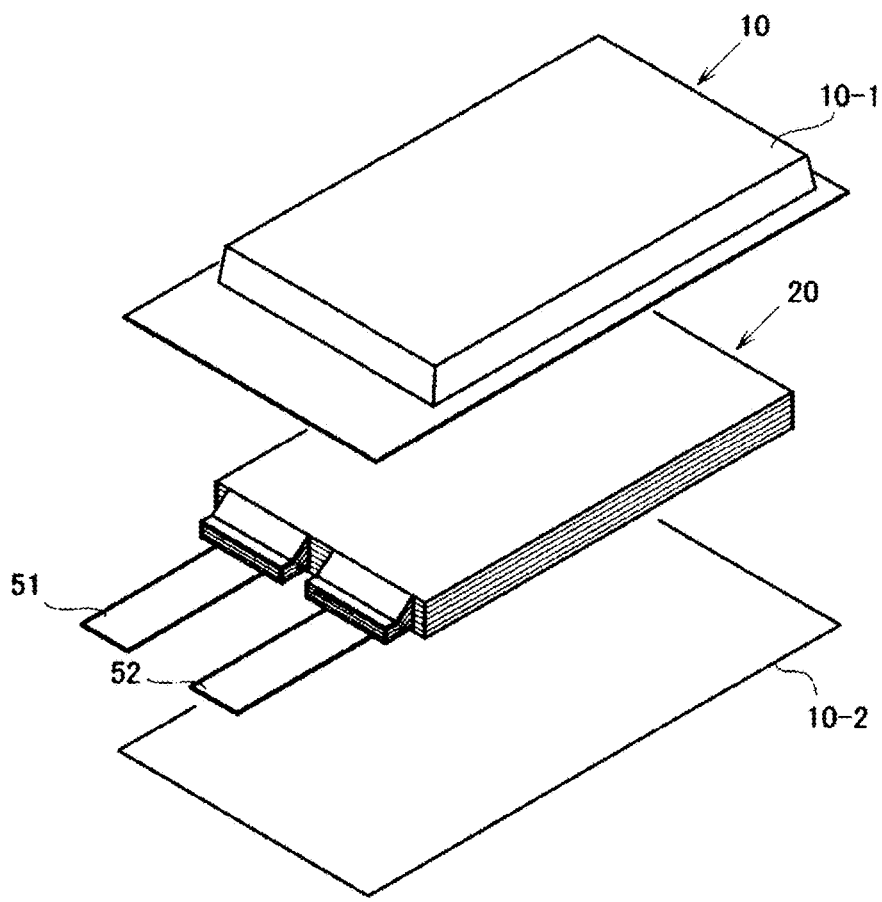
FIG. 1 is an exploded perspective view showing a basic structure of a film package battery.
Figure 2:
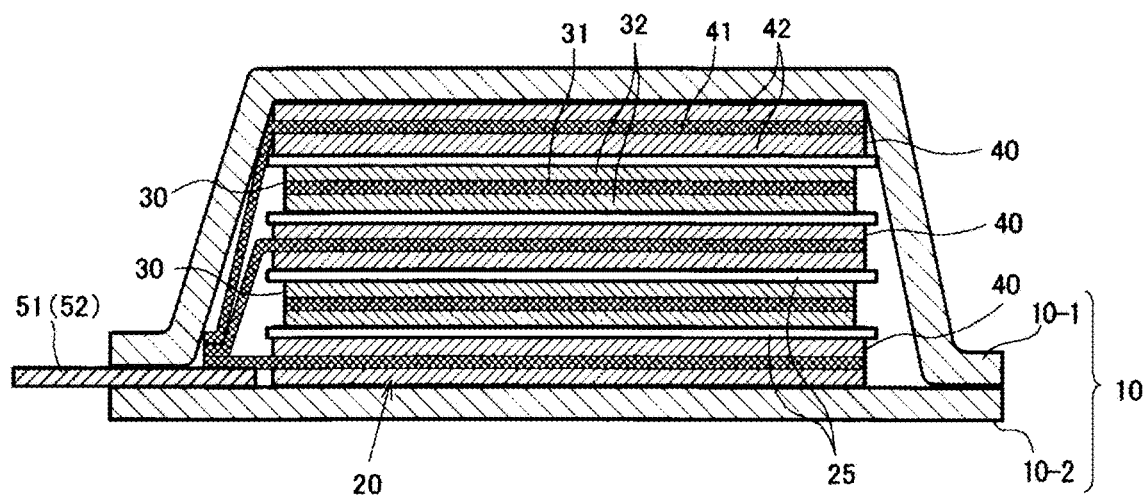
FIG. 2 is a cross-sectional view schematically showing a cross section of the battery of FIG. 1.

The lithium ion secondary battery according to the present embodiment, for example, has a structure as shown in FIGS. 1 and 2. This lithium ion secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 2. In the positive electrode 30, an electrode material 32 is applied to both surfaces of a metal foil 31, and also in the negative electrode 40, an electrode material 42 is applied to both surfaces of a metal foil 41 in the same manner. The present embodiment is not necessarily limited to stacking type batteries and may also be applied to batteries such as a winding type.

As shown in FIGS. 1 and 2, the lithium ion secondary battery may have an arrangement in which the electrode tabs are drawn out to one side of the outer package, but the electrode tab may be drawn out to both sides of the outer package. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 2). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 1, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 1 and FIG. 2, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

<Method for Manufacturing Lithium Ion Secondary Battery>

The lithium ion secondary battery according to the present embodiment can be manufactured by a conventional method. An example of a method for manufacturing a lithium ion secondary battery will be described taking a stacked laminate type lithium ion secondary battery as an example. First, in the dry air or an inert atmosphere, the positive electrode and the negative electrode are placed to oppose to each other via a separator to form an electrode element. Next, this electrode element is accommodated in an outer package (container), an electrolyte solution is injected, and the electrodes are impregnated with the electrolyte solution. Thereafter, the opening of the outer package is sealed to complete the lithium ion secondary battery.

<Assembled Battery>

A plurality of the lithium ion secondary batteries according to the present embodiment may be combined to form an assembled battery. The assembled battery may be configured by connecting two or more lithium ion secondary batteries according to the present embodiment in series or in parallel or in combination of both. The connection in series and/or parallel makes it possible to adjust the capacity and voltage freely. The number of the lithium ion secondary batteries included in the assembled battery can be set appropriately according to the battery capacity and output.

<Vehicle>

The lithium ion secondary battery or the assembled battery according to the present embodiment can be used in vehicles. Vehicles according to the present embodiment include hybrid vehicles, fuel cell vehicles, electric vehicles (besides four-wheel vehicles (cars, commercial vehicles such as buses, and trucks, light automobiles, etc.), two-wheeled vehicle (bike) and tricycle), and the like. The vehicles according to the present embodiment is not limited to automobiles, it may be a variety of power source of other vehicles, such as a moving body like a train.

EXAMPLES

Although the present embodiment will be described in detail referring the examples below, the present inventions are not limited thereto.

Example 1

(Manufacture of Electrode)

The method for manufacturing the battery of Example 1 will be described. $LiNi_{0.8}Co_{0.15}Al_{0.05}O_2$ (96.7 mass %) was used as a positive electrode active material. Carbon nanotubes (2.3 mass %) were used as conductive materials of the positive electrode. PVdF (FK polymer manufactured by Kureha corporation) (1.0 mass %) was used as a positive electrode binder. The carbon nanotubes and N-methylpyrrolidone (NMP) were mixed in advance, and this was further kneaded with the positive electrode active material and the binder. The positive electrode slurry was kneaded using a rotation revolution type three-axis mixer until it became homogeneous. The resulting positive electrode slurry was applied to an aluminum foil current collector with a thickness of 20 μm using a doctor blade, and dried at 110° C. for 5 minutes. The density of the positive electrode mixture layer was set to 3.35 g/cm³ by pressing.

The positive electrode mixture layer of the obtained positive electrode was observed by a scanning electron microscope (SEM). 100 primary particles of $LiNi_{0.8}Co_{0.15}Al_{0.05}O_2$ were randomly selected from SEM images, the particle sizes and the split widths were measured, and the average values were calculated. The average particle size and the average split width were shown in Table 1. 100 secondary particles of $LiNi_{0.8}Co_{0.15}Al_{0.05}O_2$ were randomly selected from SEM images, the particle sizes were measured, and the average value was calculated. The average particle size was shown in Table 1. 100 carbon nanotubes were randomly selected from SEM images, the lengths and diameters were measured, and the average values were calculated. The average length and the average diameter were shown in Table 1.

A copper foil with a thickness of 8 μm was used as a negative electrode current collector. 90 mass % of artificial graphite (the average particle size $D_{50}$=12 μm) and 5 mass % of SiO (the average particle size $D_{50}$=5 μm) as negative electrode active materials, 2 mass % of styrene butadiene copolymer rubber (SBR) as a binder, 2 mass % of carboxymethyl cellulose (CMC) as a thickener, and 1 mass % of carbon black as a conductive material were used. A slurry prepared by mixing these was applied to the copper foil, and dried to obtain a negative electrode mixture layer.

(Preparation of Nonaqueous Electrolyte Solution)

A mixed solvent of ethylene carbonate (EC), diethyl carbonate (DEC) and ethyl methyl carbonate (MEC) (volume ratio: EC/DEC/MEC=30/60/10) was used as a nonaqueous solvent, and $LiPF_6$ as a supporting salt was dissolved at a concentration of 1.0 mol/L in the nonaqueous electrolyte solution.

(Manufacture of Lithium Ion Secondary Battery)

The resulting positive electrode was cut into 2.8 cm×2.6 cm, and the negative electrode was cut into 3.0 cm×2.8 cm. The both surfaces of the positive electrode was covered with a polypropylene separator of 3.2 cm×3.2 cm with 3 μm alumina coating, the negative active material layer was disposed thereon so as to face the positive electrode active material layer, and an electrode stack was produced. Next, the electrode stack was sandwiched with two aluminum laminate films of 5 cm×6 cm, the three sides excluding one long side were heat sealed with a seal width of 8 mm. After injecting the electrolyte solution, the remaining side was heat sealed, to produce a laminate cell type battery.

For the fabricated battery, the following evaluations were conducted. The results are shown in Table 1.

(Initial Charge Capacity Test)

First, charging was performed at room temperature. Charging was performed by CCCV method. The charging rate was 0.2 C (1 C=100 mA), the charging time was 10 hours, and the charge cut-off voltage was 4.2 V. The charge capacity at this time was defined as initial charge capacity.

(Capacity Retention Rate)

500 times charge-discharge cycle tests were performed in a constant temperature bath at 45° C. to measure the capacity retention rate, the lifetime was evaluated. In the charging, 1 C-constant current charging was carried out until the voltage reached the upper limit voltage of 4.2 V, and a 4.2 V-constant voltage charging was successively carried out, for a total time of charging of 2.5 hours. In discharging, a 1 C-constant current discharging was carried out until 2.5 V. The capacity after the charge-discharge cycle test was measured, and the ratio (%) to the capacity before the charge-discharge cycle test was calculated.

(Measurement Test of Aging Efficiency)

First the battery whose initial charge capacity had been measured was allowed to stand for 20 days in a constant temperature bath at 45° C. The battery was taken out from the constant temperature bath, discharged at 1 C (1 C=100 mA) to 2.5 V, charged at 1 C (1 C=100 mA) to 4.2 V, and then discharged to 2.5 V at discharge rates of 1 C (1 C=100 mA), 0.5 C (1 C=100 mA) and 0.2 C (1 C=100 mA). The aging efficiency was calculated according to the following formula: 0.2 C discharge capacity/initial charge capacity×100(%).

(Measurement Test of Recovery Capacity Rate)

The battery whose aging efficiency had been measured was further allowed to stand for 12 weeks (84 days) in a constant temperature bath at 45° C. The battery was taken out from the constant temperature bath. After the battery was cooled to room temperature after 2 hours, it was discharged at 1 C (1 C=100 mA) to 2.5 V, charged at 1 C (1 C=100 mA) to 4.2 V, and then discharged to 2.5 V at discharge rates of 1 C (1 C=100 mA), 0.5 C (1 C=100 mA) and 0.2 C (1 C=100 mA). The recovery capacity rate was calculated according to the following formula: 100×(recovery capacity at 0.2 C after 12 weeks)/(charge capacity after aging) (%).

In other examples, batteries were manufactured in the same manner as in Example 1, and the same battery evaluations were conducted, but the points described below were changed. Table 1 also shows the results of these examples.

Example 2

A positive electrode active material ($LiNi_{0.8}Co_{0.15}Al_{0.05}O_2$) and carbon nanotubes that had different sizes from those of Example 1 were used.

Example 3

A positive electrode active material ($LiNi_{0.8}Co_{0.15}Al_{0.05}O_2$) that had different size from that of Example 1 was used.

Example 4

A positive electrode active material ($LiNi_{0.8}Co_{0.15}Al_{0.05}O_2$) that had different size from that of Example 1 was used. The content of carbon nanotubes in the positive electrode mixture layer was increased to 3.5 mass %. The amount of the positive electrode active material was reduced by the increased amount of carbon nanotubes.

Example 5

A positive electrode active material (LiNi$_{0.8}$Co$_{0.15}$Al$_{0.05}$O$_2$) and carbon nanotubes that had different sizes from those of Example 1 were used.

Example 6

Carbon nanotubes that had different sizes from those of Example 1 were used.

Example 7

A positive electrode active material (LiNi$_{0.8}$Co$_{0.15}$Al$_{0.05}$O$_2$) and carbon nanotubes that had different sizes from those of Example 1 were used.

Example 8

A positive electrode active material (LiNi$_{0.8}$Co$_{0.15}$Al$_{0.05}$O$_2$) that had different size from that of Example 1 was used.

Example 9

A positive electrode active material (LiNi$_{0.8}$Co$_{0.15}$Al$_{0.05}$O$_2$) and carbon nanotubes that had different sizes from those of Example 1 were used.

Example 10

A positive electrode active material (LiNi$_{0.8}$Co$_{0.15}$Al$_{0.05}$O$_2$) that had different size from that of Example 1 was used. In addition, the density of the positive electrode mixture layer was 3.25 g/cm$^3$.

Example 11

A positive electrode active material (LiNi$_{0.8}$Co$_{0.15}$Al$_{0.05}$O$_2$) that had different size from that of Example 1 was used. In addition, the density of the positive electrode mixture layer was 3.50 g/cm$^3$.

Example 12

A positive electrode active material (LiNi$_{0.8}$Co$_{0.15}$Al$_{0.05}$O$_2$) that had different size from that of Example 1 was used. In addition, the density of the positive electrode mixture layer was 3.21 g/cm$^3$.

Comparative Example 1

Carbon nanotubes that had different sizes from those of Example 1 were used.

Comparative Example 2

A positive electrode active material (LiNi$_{0.8}$Co$_{0.15}$Al$_{0.05}$O$_2$) and carbon nanotubes that had different sizes from those of Example 1 were used.

Comparative Example 3

Carbon nanotubes that had different sizes from those of Example 1 were used. The density of the positive electrode mixture layer was 3.21 g/cm$^3$.

Comparative Example 4

In the positive electrode mixture layer, carbon nanotubes were not added, and carbon black was used as a conductive material. The content of carbon black in the positive electrode mixture layer was 2.3 mass %.

Reference Example 1

LiNi$_{0.5}$Co$_{0.2}$Al$_{0.3}$O$_2$ was used as a positive electrode active material. Carbon nanotubes (2.3 mass %) were used as conductive materials of the positive electrode. PVdF (FK polymer manufactured by Kureha corporation) was used as a positive electrode binder. The carbon nanotubes and N-methylpyrrolidone (NMP) were mixed in advance, and this was further kneaded with the positive electrode active material and the binder. The positive electrode slurry was kneaded using a rotation revolution type three-axis mixer until it became homogeneous. The resulting positive electrode slurry was applied to an aluminum foil current collector with a thickness of 20 μm using a doctor blade, and dried at 110° C. for 5 minutes. The density of the positive electrode mixture layer was set to 3.35 g/cm$^3$ by pressing.

The positive electrode mixture layer of the obtained positive electrode was observed by a scanning electron microscope (SEM). 100 primary particles of LiNi$_{0.5}$Co$_{0.2}$Al$_{0.3}$O$_2$ were randomly selected from SEM images, the particle sizes and the split widths were measured, and the average values were calculated. The average particle size and the average split width were shown in Table 1. 100 secondary particles of LiNi$_{0.5}$Co$_{0.2}$Al$_{0.3}$O$_2$ were randomly selected from SEM images, the particle sizes were measured, and the average value was calculated. The average particle size was shown in Table 1. 100 carbon nanotubes were randomly selected from SEM images, the lengths and diameters were measured, and the average values were calculated. The average length and the average diameter were shown in Table 1.

The other constituents were the same as in Example 1, and a battery was manufactured. The same battery evaluations as in Example 1 were conducted.

In other Reference examples, batteries were manufactured in the same manner as in Reference example 1, and the same battery evaluations were conducted, but the points described below were changed. Table 1 also shows the results of these Reference examples.

Reference Example 2

A positive electrode active material (LiNi$_{0.5}$Co$_{0.2}$Al$_{0.3}$O$_2$) and carbon nanotubes that had different sizes from those of Reference example 1 were used.

Reference Example 3

A positive electrode active material (LiNi$_{0.5}$Co$_{0.2}$Al$_{0.3}$O$_2$) and carbon nanotubes that had different sizes from those of Reference example 1 were used.

Reference Example 4

A positive electrode active material (LiNi$_{0.5}$Co$_{0.2}$Al$_{0.3}$O$_2$) and carbon nanotubes that had different sizes from those of Reference example 1 were used. In addition, the density of the positive electrode mixture layer was 3.25 g/cm$^3$.

Reference Example 5

A positive electrode active material (LiNi$_{0.5}$Co$_{0.2}$Al$_{0.3}$O$_2$) and carbon nanotubes that had different sizes from those of Reference example 1 were used.

TABLE 1

| | (1) Positive electrode active material (NCA) | | | (4) Carbon nanotubes (CNT) | (5) |
|---|---|---|---|---|---|
| | Identity | (1) Primary particle size nm | (2) Secondary particle size μm | (3) split width nm | Amount wt % | Length nm |
| Comparative example 1 | $LiNi_{0.8}Co_{0.15}Al_{0.05}O_2$ | 500 | 7 | 300 | 2.3 | 100 |
| Comparative example 2 | $LiNi_{0.8}Co_{0.15}Al_{0.05}O_2$ | 300 | 7 | 300 | 2.3 | 100 |
| Example 1 | $LiNi_{0.8}Co_{0.15}Al_{0.05}O_2$ | 500 | 7 | 300 | 2.3 | 360 |
| Example 2 | $LiNi_{0.8}Co_{0.15}Al_{0.05}O_2$ | 100 | 7 | 300 | 2.3 | 100 |
| Example 3 | $LiNi_{0.8}Co_{0.15}Al_{0.05}O_2$ | 300 | 7 | 300 | 2.3 | 360 |
| Example 4 | $LiNi_{0.8}Co_{0.15}Al_{0.05}O_2$ | 300 | 7 | 300 | 3.5 | 360 |
| Example 5 | $LiNi_{0.8}Co_{0.15}Al_{0.05}O_2$ | 300 | 7 | 300 | 2.3 | 360 |
| Example 6 | $LiNi_{0.8}Co_{0.15}Al_{0.05}O_2$ | 500 | 7 | 300 | 2.3 | 800 |
| Example 7 | $LiNi_{0.8}Co_{0.15}Al_{0.05}O_2$ | 300 | 7 | 300 | 2.3 | 800 |
| Example 8 | $LiNi_{0.8}Co_{0.15}Al_{0.05}O_2$ | 100 | 7 | 300 | 2.3 | 360 |
| Example 9 | $LiNi_{0.8}Co_{0.15}Al_{0.05}O_2$ | 100 | 7 | 300 | 2.3 | 800 |
| Example 10 | $LiNi_{0.8}Co_{0.15}Al_{0.05}O_2$ | 300 | 7 | 100 | 2.3 | 360 |
| Example 11 | $LiNi_{0.8}Co_{0.15}Al_{0.05}O_2$ | 300 | 7 | 600 | 2.3 | 360 |
| Comparative example 3 | $LiNi_{0.8}Co_{0.15}Al_{0.05}O_2$ | 500 | 7 | 0 | 2.3 | 100 |
| Example 12 | $LiNi_{0.8}Co_{0.15}Al_{0.05}O_2$ | 300 | 7 | 0 | 2.3 | 360 |
| Comparative example 4 | $LiNi_{0.8}Co_{0.15}Al_{0.05}O_2$ | 300 | 7 | 300 | 0 | — |
| Reference example 1 | $LiNi_{0.5}Co_{0.2}Al_{0.3}O_2$ | 500 | 7 | 300 | 2.3 | 100 |
| Reference example 2 | $LiNi_{0.5}Co_{0.2}Al_{0.3}O_2$ | 300 | 7 | 300 | 2.3 | 360 |
| Reference example 3 | $LiNi_{0.5}Co_{0.2}Al_{0.3}O_2$ | 300 | 7 | 300 | 2.3 | 800 |
| Reference example 4 | $LiNi_{0.5}Co_{0.2}Al_{0.3}O_2$ | 300 | 7 | 0 | 2.3 | 360 |
| Reference example 5 | $LiNi_{0.6}Co_{0.2}Al_{0.3}O_2$ | 100 | 7 | 300 | 2.3 | 360 |

| | (6) Carbon nanotubes (CNT) Diameter nm | (7) CNT/NCA (5)/(1) | Initial capacity mAh | Capacity retention rate % | Aging efficiency % | Recovering capacity rate % |
|---|---|---|---|---|---|---|
| Comparative example 1 | 20 | 0.2 | 136 | 78 | 67 | 78 |
| Comparative example 2 | 20 | 0.3 | 138 | 79 | 68 | 79 |
| Example 1 | 20 | 0.7 | 140 | 85 | 74 | 83 |
| Example 2 | 20 | 1.0 | 138 | 88 | 73 | 84 |
| Example 3 | 20 | 1.2 | 138 | 91 | 76 | 85 |
| Example 4 | 20 | 1.2 | 141 | 92 | 78 | 86 |
| Example 5 | 50 | 1.2 | 138 | 78 | 67 | 78 |
| Example 6 | 20 | 1.6 | 139 | 92 | 75 | 85 |
| Example 7 | 20 | 2.7 | 140 | 95 | 80 | 91 |
| Example 8 | 20 | 3.6 | 138 | 88 | 73 | 82 |
| Example 9 | 20 | 8.0 | 139 | 87 | 74 | 83 |
| Example 10 | 20 | 1.2 | 136 | 85 | 73 | 83 |
| Example 11 | 20 | 1.2 | 138 | 86 | 72 | 82 |
| Comparative example 3 | 20 | 0.2 | 134 | 67 | 65 | 71 |
| Example 12 | 20 | 1.2 | 137 | 70 | 69 | 79 |
| Comparative example 4 | — | — | 138 | 68 | 66 | 70 |
| Reference example 1 | 20 | 0.2 | 85 | 93 | 79 | 88 |
| Reference example 2 | 20 | 1.2 | 86 | 94 | 79 | 89 |
| Reference example 3 | 20 | 2.7 | 87 | 95 | 80 | 91 |
| Reference example 4 | 20 | 1.2 | 86 | 94 | 78 | 89 |
| Reference example 5 | 20 | 3.6 | 86 | 95 | 79 | 90 |

Example 13

LiNi$_{0.8}$Co$_{0.1}$Mn$_{0.1}$O$_2$ (96.9 mass %) was used as a positive electrode active material. Carbon nanotubes (1.6 mass %) were used as conductive materials of the positive electrode. PVdF (FK polymer manufactured by Kureha corporation) (1.5 mass %) was used as a positive electrode binder. The carbon nanotubes and N-methylpyrrolidone (NMP) were mixed in advance, and this was further kneaded with the positive electrode active material and the binder. The positive electrode slurry was kneaded using a rotation revolution type three-axis mixer until it became homogeneous. The resulting positive electrode slurry was applied to an aluminum foil current collector with a thickness of 20 μm using a doctor blade, and dried at 110° C. for 5 minutes. The density of the positive electrode mixture layer was set to 3.60 g/cm$^3$ by pressing. The other constituents were the same as in Example 1, and a battery was manufactured. The same battery evaluations as in Example 1 were conducted. Table 2 shows the results.

In other examples, batteries were manufactured in the same manner as in Example 13, and the same battery evaluations were conducted, but the points described below were changed. Table 2 also shows the results of these examples.

Example 14

A positive electrode active material (LiNi$_{0.8}$Co$_{0.1}$Mn$_{0.1}$O$_2$) and carbon nanotubes that had different sizes from those of Example 13 were used.

Example 15

A positive electrode active material (LiNi$_{0.8}$Co$_{0.1}$Mn$_{0.1}$O$_2$) and carbon nanotubes that had different sizes from those of Example 13 were used. In the positive electrode mixture layer, the amount of the positive electrode active material was 95.3 mass %, and the amount of carbon nanotubes was 3.2 mass %.

Example 16

A positive electrode active material (LiNi$_{0.8}$Co$_{0.1}$Mn$_{0.1}$O$_2$) and carbon nanotubes that had different sizes from those of Example 13 were used.

Example 17

A positive electrode active material (LiNi$_{0.8}$Co$_{0.1}$Mn$_{0.1}$O$_2$) and carbon nanotubes that had different sizes from those of Example 13 were used.

Example 18

A positive electrode active material (LiNi$_{0.8}$Co$_{0.1}$Mn$_{0.1}$O$_2$) and carbon nanotubes that had different sizes from those of Example 13 were used.

Example 19

A positive electrode active material (LiNi$_{0.8}$Co$_{0.1}$Mn$_{0.1}$O$_2$) and carbon nanotubes that had different sizes from those of Example 13 were used. In addition, the density of the positive electrode mixture layer was 3.25 g/cm$^3$.

Example 20

A positive electrode active material (LiNi$_{0.8}$Co$_{0.1}$Mn$_{0.1}$O$_2$) and carbon nanotubes that had different sizes from those of Example 13 were used. In addition, the density of the positive electrode mixture layer was 3.65 g/cm$^3$.

Example 21

A positive electrode active material (LiNi$_{0.8}$Co$_{0.1}$Mn$_{0.1}$O$_2$) and carbon nanotubes that had different sizes from those of Example 13 were used. In addition, the density of the positive electrode mixture layer was 3.25 g/cm$^3$.

Comparative Example 5

A positive electrode active material (LiNi$_{0.8}$Co$_{0.1}$Mn$_{0.1}$O$_2$) that had different size from that of Example 13 was used. Carbon nanotubes were not added, and carbon black was used as a conductive material. In the positive electrode mixture layer, the amount of the positive electrode active material was 96.9 mass %, and the amount of carbon black was 1.6 mass %.

Example 22

A positive electrode active material (LiNi$_{0.8}$Co$_{0.1}$Mn$_{0.1}$O$_2$) and carbon nanotubes that had different sizes from those of Example 13 were used.

Example 23

A positive electrode active material (LiNi$_{0.8}$Co$_{0.1}$Mn$_{0.1}$O$_2$) and carbon nanotubes that had different sizes from those of Example 13 were used.

Reference Example 6

LiNi$_{0.5}$Co$_{0.2}$Mn$_{0.3}$O$_2$ (96.9 mass %) was used as a positive electrode active material. Carbon nanotubes (1.6 mass %) were used as conductive materials of the positive electrode. PVdF (FK polymer manufactured by Kureha corporation) (1.5 mass %) was used as a positive electrode binder. The carbon nanotubes and N-methylpyrrolidone (NMP) were mixed in advance, and this was further kneaded with the positive electrode active material and the binder. The positive electrode slurry was kneaded using a rotation revolution type three-axis mixer until it became homogeneous. The resulting positive electrode slurry was applied to an aluminum foil current collector with a thickness of 20 μm using a doctor blade, and dried at 110° C. for 5 minutes. The density of the positive electrode mixture layer was set to 3.60 g/cm$^3$ by pressing. The other constituents were the same as in Example 1, and a battery was manufactured. The same battery evaluations as in Example 1 were conducted. Table 2 shows the results.

In other Reference examples, batteries were manufactured in the same manner as in Reference example 6, and the same battery evaluations were conducted, but the points described below were changed. Table 2 also shows the results of these Reference examples.

Reference Example 7

Carbon nanotubes that had different sizes from those of Reference example 6 were used.

Reference Example 8

The density of the positive electrode mixture layer was 3.25 g/cm³.

TABLE 2

| | | (1) Positive electrode active material (NCM) | | (2) | (3) | (4) Carbon nanotubes (CNT) | (5) |
|---|---|---|---|---|---|---|---|
| | Identity | Primary particle size nm | Secondary particle size µm | Initial split width nm | Amount wt % | Length nm |
| Example 13 | $LiNi_{0.8}Co_{0.1}Mn_{0.1}O_2$ | 50 | 10 | 150 | 1.6 | 100 |
| Example 14 | $LiNi_{0.8}Co_{0.1}Mn_{0.1}O_2$ | 150 | 10 | 150 | 1.6 | 360 |
| Example 15 | $LiNi_{0.8}Co_{0.1}Mn_{0.1}O_2$ | 150 | 10 | 150 | 3.2 | 360 |
| Example 16 | $LiNi_{0.8}Co_{0.1}Mn_{0.1}O_2$ | 150 | 10 | 150 | 1.6 | 360 |
| Example 17 | $LiNi_{0.8}Co_{0.1}Mn_{0.1}O_2$ | 250 | 10 | 150 | 1.6 | 800 |
| Example 18 | $LiNi_{0.8}Co_{0.1}Mn_{0.1}O_2$ | 150 | 10 | 150 | 1.6 | 800 |
| Example 19 | $LiNi_{0.8}Co_{0.1}Mn_{0.1}O_2$ | 150 | 10 | 50 | 1.6 | 360 |
| Example 20 | $LiNi_{0.8}Co_{0.1}Mn_{0.1}O_2$ | 150 | 10 | 300 | 1.6 | 360 |
| Example 21 | $LiNi_{0.8}Co_{0.1}Mn_{0.1}O_2$ | 150 | 10 | 0 | 1.6 | 360 |
| Comparative example 5 | $LiNi_{0.8}Co_{0.1}Mn_{0.1}O_2$ | 150 | 10 | 150 | 0 | — |
| Example 22 | $LiNi_{0.8}Co_{0.1}Mn_{0.1}O_2$ | 80 | 10 | 150 | 1.6 | 360 |
| Example 23 | $LiNi_{0.8}Co_{0.1}Mn_{0.1}O_2$ | 80 | 10 | 150 | 1.6 | 800 |
| Reference example 6 | $LiNi_{0.5}Co_{0.2}Mn_{0.3}O_2$ | 150 | 10 | 150 | 1.6 | 360 |
| Reference example 7 | $LiNi_{0.5}Co_{0.2}Mn_{0.3}O_2$ | 150 | 10 | 150 | 1.6 | 800 |
| Reference example 8 | $LiNi_{0.5}Co_{0.2}Mn_{0.3}O_2$ | 150 | 10 | 0 | 1.6 | 360 |

| | (6) Carbon nanotubes (CNT) Diameter nm | (7) CNT/NCM (5)/(1) | Initial capacity mAh | Capacity retention rate % | Aging efficiency % | Recovering capacity rate % |
|---|---|---|---|---|---|---|
| Example 13 | 20 | 2.0 | 137 | 89 | 73 | 85 |
| Example 14 | 20 | 2.4 | 137 | 92 | 76 | 86 |
| Example 15 | 20 | 2.4 | 140 | 93 | 78 | 87 |
| Example 16 | 50 | 2.4 | 137 | 79 | 67 | 79 |
| Example 17 | 20 | 3.2 | 138 | 93 | 75 | 86 |
| Example 18 | 20 | 5.3 | 139 | 96 | 80 | 92 |
| Example 19 | 20 | 2.4 | 135 | 85 | 73 | 84 |
| Example 20 | 20 | 2.4 | 137 | 86 | 72 | 83 |
| Example 21 | 20 | 2.4 | 136 | 70 | 69 | 80 |
| Comparative example 5 | — | — | 136 | 68 | 66 | 72 |
| Example 22 | 20 | 4.5 | 138 | 89 | 73 | 84 |
| Example 23 | 20 | 10.0 | 138 | 89 | 74 | 85 |
| Reference example 6 | 20 | 2.4 | 83 | 94 | 79 | 89 |
| Reference example 7 | 20 | 5.3 | 83 | 95 | 80 | 91 |
| Reference example 8 | 20 | 2.4 | 84 | 94 | 78 | 89 |

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The lithium ion secondary battery according to the present embodiment can be utilized in, for example, all the industrial fields requiring a power supply and the industrial fields pertaining to the transportation, storage and supply of electric energy. Specifically, it can be used in, for example, power supplies for mobile equipment such as cellular phones and notebook personal computers; power supplies for electrically driven vehicles including an electric vehicle, a hybrid vehicle, an electric motorbike and an electric-assisted bike, and moving/transporting media such as trains, satellites and submarines; backup power supplies for UPSs; and electricity storage facilities for storing electric power generated by photovoltaic power generation, wind power generation and the like.

EXPLANATION OF SYMBOLS 10 film package
20 battery element
25 separator
30 positive electrode
40 negative electrode

The invention claimed is:

1. A lithium ion secondary battery, comprising:
a lithium nickel composite oxide represented by the following formula, and carbon nanotubes in a positive electrode mixture layer in a positive electrode,
wherein a ratio (a)/(b) of an average length (a) of the carbon nanotubes to an average particle size (b) of primary particles of the lithium nickel composite oxide is 0.5 or more, and an average length of the carbon nanotubes is 100 nm or more and 840 nm or less,
an average diameter of outermost cylinders of the carbon nanotubes is 40 nm or less,
an average split width of gaps between the primary particles is 50 nm or more and 700 nm or less,
an average particle size of secondary particles of the lithium nickel composite oxide is 1 µm or more and 16 µm or less, and
the carbon nanotubes are disposed within the gaps between the primary particles of the lithium nickel composite oxide;

$$Li_yNi_{(1-x)}M_xO_2$$

wherein $0 \leq x \leq 0.4$, $0 < y \leq 1.2$, and M is at least one element selected from the group consisting of Co, Al, Mn, Fe, Ti, and B.

2. The lithium ion secondary battery according to claim 1, wherein an average particle size of the primary particles is 50 nm or more and 700 nm or less.

3. The lithium ion secondary battery according to claim 1, wherein a density of a positive electrode mixture layer is 3.25 g/cm³ or more.

4. The lithium ion secondary battery according to claim 1, wherein an average split width of the primary particles before charging-discharging the lithium ion secondary battery is 50 nm or more and 700 nm or less.

5. A vehicle equipped with the lithium ion secondary battery according to claim 1.

6. A method for manufacturing a lithium ion secondary battery, comprising the steps of:
preparing a slurry comprising a positive electrode active material comprising a lithium nickel composite oxide represented by the following formula, a conductive material comprising carbon nanotubes, a binder and a solvent, and applying the slurry to a positive electrode current collector to form a positive electrode mixture layer,
obtaining a positive electrode by pressing the positive electrode mixture layer,
fabricating an electrode element by stacking the positive electrode and a negative electrode via a separator, and
encapsulating the electrode element and an electrolyte solution into an outer package,
wherein a ratio (a)/(b) of an average length (a) of the carbon nanotubes to an average particle size (b) of primary particles of the lithium nickel composite oxide is 0.5 or more, and an average length of the carbon nanotubes is 100 nm or more and 840 nm or less,
an average diameter of outermost cylinders of the carbon nanotubes is 40 nm or less,
an average split width of gaps between the primary particles is 50 nm or more and 700 nm or less,
an average particle size of secondary particles of the lithium nickel composite oxide is 1 µm or more and 16 µm or less, and
the carbon nanotubes are disposed within the gaps between the primary particles of the lithium nickel composite oxide;

$$Li_yNi_{(1-x)}M_xO_2$$

wherein $0 \leq x \leq 0.4$, $0 < y \leq 1.2$, and M is at least one element selected from the group consisting of Co, Al, Mn, Fe, Ti, and B.

7. The lithium ion secondary battery according to claim 1, wherein the carbon nanotubes form a conductive path in the gaps between the primary particles of the lithium nickel composite oxide.

* * * * *